United States Patent
Mikhailov et al.

[15] 3,698,235
[45] Oct. 17, 1972

[54] EBULLIOMETER

[72] Inventors: Nikolai Petrovich Mikhailov; Lev Moiseevich Rapoport; Samuil Zalmanovich Taits, all of Moscow, U.S.S.R.

[73] Assignee: Institut Organicheskoi khimii im. N.D. Zelinskogo AN SSSR, Moscow, U.S.S.R.

[22] Filed: June 11, 1970

[21] Appl. No.: 45,353

[52] U.S. Cl. .................................................73/17 A
[51] Int. Cl. ..........................................G01n 25/08
[58] Field of Search.............................................73/17

[56] References Cited

OTHER PUBLICATIONS

Swietoslawski, " Ebulliometric Measurements," Reinhold Publishing Co., 1945, QC 304.59, pgs. 4 and 5.

Glover et al., " Ebulliometric Apparatus for Studying Number-Average Mol. Wt. of Polymers," in Analytical Chemistry, Vol. 33, No. 3, March 1961, pg. 447–450.

Primary Examiner—Richard C. Queisser
Assistant Examiner—Herbert Goldstein
Attorney—Waters, Roditi, Schwartz & Nissen

[57] ABSTRACT

An ebulliometer having an air lift in the form of a chamber separated by at least one partition into sections having outlet nozzles for feeding a vapor-air mixture of a solvent and a solution of a substance under investigation onto a device for measuring the temperature difference between the boiling points of the solvent and the solution, the nozzles being so arranged that each of them communicates with one section.

2 Claims, 3 Drawing Figures

EBULLIOMETER

The present invention relates to devices for the physicochemical investigation of organic compounds, and more particularly to ebulliometers designed for determining the molecular weights of individual organic compounds and the mean numerical molecular weights of oligomers and polymers, for the precision determination of the boiling points of organic solvents, and for the calibration of thermocouples and thermometers. Known in the prior art are ebulliometers as, for example, shown by C.A. Glover and R.R. Stanley, Anal. Chem.; 33,447 (1961) "Ebulliometric apparatus for studying average molecular weights of polymers." More specifically, there are known ebulliometers of the type which includes a measuring cell in which the vapor liquid mixture of a solvent and the solution of a substance being determined is fed through an air-lift chamber and nozzle to the device measuring the difference of temperatures between the boiling points of a solvent and the solution.

In the said ebulliometers, the air-lift chamber has one nozzle for feeding the vapor liquid mixture to the device measuring the temperature difference, which limits the sensitivity of these ebulliometers as a result of the high level of oscillation and thermal noises in comparison with the level of the useful signal.

An object of the present invention is to provide an ebulliometer making it possible to considerable reduce the level of the oscillation and thermal noises.

In accordance with this object, in an ebulliometer in whose measuring cell the vapor-liquid mixture of the solvent and the solution of the substance being determined is fed through the air-lift chamber and nozzle to the device measuring the difference in temperatures between the boiling points of the solvent and the solution, according to the invention, the air-lift chamber is divided into sections by means of at least one partition and is provided with additional nozzles for feeding the vapor-liquid mixture to the device measuring the temperature difference the partitions and nozzles being so arranged that each of the nozzles communicates with one section.

Such a construction of an ebulliometer makes it possible to increase its sensitivity ten times in comparison with that of the known ebulliometers mentioned above to extend the sphere of its application in measurements both with respect to the kind of organic compounds investigated and to their molecular weights.

The details of the present invention will become more fully apparent from a consideration of the following description of an exemplary embodiment thereof, taken in conjunction with the accompanying drawings, in which.

The description given below is of an ebulliometer according to the present invention applicable for measuring the molecular weights of individual organic compounds (substances being determined).

Figure 1:
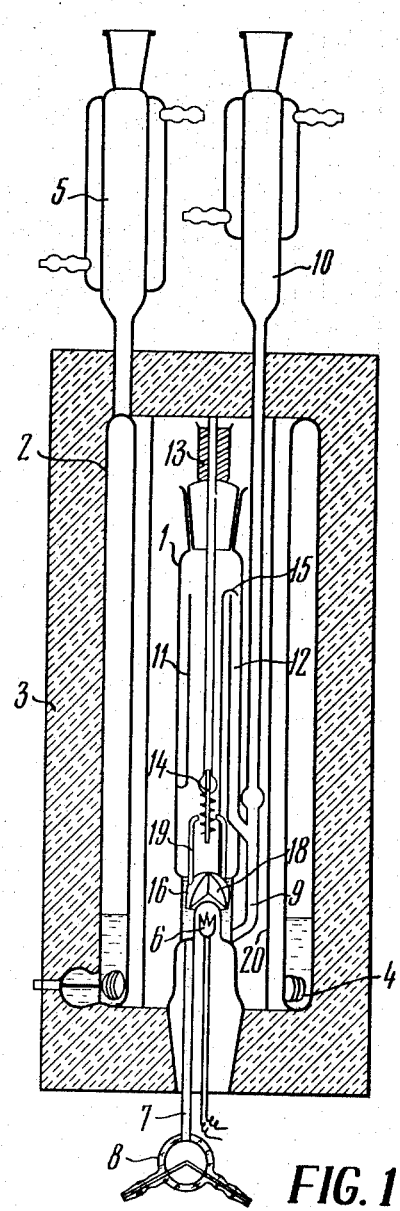
FIG. 1 is a longitudinal section of an ebulliometer according to the present invention.

The ebulliometer according to the present invention comprises a measuring cell 1 (FIG. 1) placed in a thermostat 2 surrounded by thermal-insulating material 3 and provided with heater 4 and return condenser 5.

Measuring cell 1 is made from thermo-resistant glass in the form of a cylindrical vessel. Heater 6, covered with crushed glass for creating boiling centers is disposed in measuring unit 1 in the bottom thereof. The bottom part of cell 1 also contains the solvent (or the solution of the substance being determined), and drain tube 7 is soldered into it. Tube 7 is filled with mercury or another liquid preventing the formation of a dead space, and is provided with a three-way valve 8 for draining off the mercury and the spent solvent and solution.

Tube 9 for returning the condensate from return condenser 10 is soldered into a side of the bottom part of cell 1.

Measuring cell 1 contains a cylinder 11. The annular gap 12 formed by cylinder 11 and cell 1 is connected to tube 9.

A device 14 for measuring the difference in temperatures between the boiling points of the solvent and the solution of the substance being determined is installed in the top part of cell 1 with the aid of packing 13.

Figure 2:
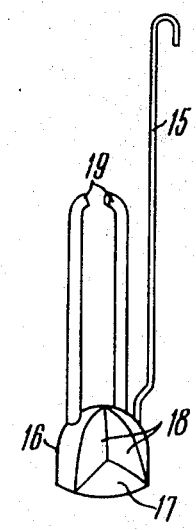
FIG. 2 is a perspective view of the air lift of the ebulliometer FIG. 1.
Figure 3:
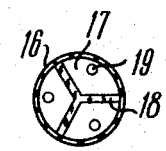
FIG. 3 is a bottom view of the same.

An air lift is suspended on cylinder 11 by means of suspension 15. The air lift is designed in the form of chamber 16 made from glass and divided into sections 17 (FIGS. 2 and 3) of equal volume by partitions 18. Each section 17 has one outlet 19 for feeding the vapor-liquid mixture of the solvent and the solution of the substance being determined to device 14 for measuring the temperature difference, the outlet being in the form of a tube whose bent end is a nozzle directed tangentially to the circumference of the device 14 measuring the temperature difference.

Screen 20 (FIG. 1), opaque to infra-red rays, is installed between measuring cell 1 and thermostat 2.

The proposed ebulliometer operates as follows.

As a result of boiling of the solvent in thermostat 2 (FIG. 1), ensured by heater 4, measuring cell 1 is at the boiling point of the solvent. The level of the solvent in measuring cell 1 approximately corresponds to the height of chamber 16. Heater 6 imparts to the solvent in measuring cell 1 the energy required for its boiling.

The vapor formed, when the solvent boils, creates in each section 17 of chamber 16 an excess pressure which is 6°the following forces of resistance: the hydrostatic pressure of the column of solvent and the forces of surface tension acting on the border between the liquid and the surface of the tube with outlet 19. When the forces induced by the pressure of the vapor reach a limiting value exceeding the said forces of resistance, the column of solvent in the form of alternating zones of vapor and liquid rises along the tube and is discharged from the nozzle onto the surface of device 14 for measuring the temperature difference. This process is repeated many times independently in each section 17 of chamber 16, owing to which a continuous flow of the solvent is achieved along the surface of device 14 for measuring the temperature difference.

The solvent vapors leaving the outlet 19 rise and along annular gap 12 and tube 9 enter return condenser 10, wherefrom in the form of a condensate the solvent is returned to the bottom part of measuring cell 1 along tube 9.

A specimen of the substance being determined, for measuring its molecular weight, is introduced through return condenser 10 into tube 9. In the latter, the specimen as a result of contact with the stream of solvent dissolves, and the solution gets into the air lift, which now feeds the vapor-liquid mixture of the solution with the vapors of the solvent to device 14 for measuring the temperature difference. A steady state of the solution is achieved with sufficient rapidity as a result of the high output of the air lift.

The solution fed from outlets 19 uniformly flows around the bottom part of device 14 for measuring the temperature difference, owing to which there is a low level of oscillation and also of thermal noise, and the result is a higher sensitivity of the ebulliometer.

The signal from device 14 created by the temperature difference is registered by a self-recording device after passing through an amplifier (both are absent in the drawing) and the integral diagram obtained is used to compute the value of the molecular weight of the substance being determined.

The level of noise of device 14 for measuring the temperature difference is also considerably reduced owing to the use of screen 20 which is opaque to the infra-red radiation appearing when the solvent boils in thermostat 2, and also as a result of the use of highly stabilized direct current as a source of power for heaters 4 and 6.

A reduction of the time required for the setting in of steady-state conditions in the ebulliometer is also achieved by excluding possible places of solvent stagnation, where dissolving would take place at the expense of diffusion, especially in drain tube 7, owing to the provision on its end of three-way valve 8 through which it is filled with mercury.

The ebulliometer according to the present invention has a sensitivity of at least $5 \times 10^{-6}$ °C/mm. This ebulliometer has been used to measure the molecular weights of nonvolatile chelate compounds with a limited solubility, silico-organic polymers and other high-molecular compounds.

What is claimed is:

1. An ebulliometer comprising a measuring cell containing a solvent and a solution of the substance under investigation; an air lift disposed in said measuring cell; measuring means in said measuring cell for measuring the temperature difference between the boiling points of said solvent and said solution of the substances under investigation, further means to form a vapor-liquid mixture of said solvent and said solution of the substance under investigation; said air lift having a chamber and including at least one partition which divides the air lift into sections, said air lift including outlet means for feeding said vapor-liquid mixture formed by said further means onto said measuring means, said outlet means including nozzles communicating with respective sections; means for heating said measuring cell to a predetermined temperature.

2. An ebulliometer as claimed in claim 1 wherein said nozzles are disposed around said measuring means to direct vapor-liquid mixture tangentially against said measuring means.

* * * * *